(12) United States Patent
Rowley et al.

(10) Patent No.: US 8,329,088 B1
(45) Date of Patent: Dec. 11, 2012

(54) PROCESS FOR OVER-MOLDING ONTO CROSSLINKED POLYMERS

(75) Inventors: William W. Rowley, Chagrin Falls, OH (US); Richard T. Seman, Newbury, OH (US)

(73) Assignee: Mercury Plastics, Inc., Middlefield, OH (US)

( * ) Notice: Subject to any disclaimer, the term of this patent is extended or adjusted under 35 U.S.C. 154(b) by 202 days.

(21) Appl. No.: 12/827,424

(22) Filed: Jun. 30, 2010

Related U.S. Application Data

(63) Continuation-in-part of application No. 10/905,974, filed on Jan. 28, 2005, now abandoned.

(51) Int. Cl.
*B29C 45/14* (2006.01)

(52) U.S. Cl. ...... 264/494; 264/259; 264/265; 264/271.1

(58) Field of Classification Search ............ None
See application file for complete search history.

(56) References Cited

U.S. PATENT DOCUMENTS

| | | |
|---|---|---|
| 4,316,870 A | 2/1982 | Rowley |
| 4,446,084 A | 5/1984 | Rowley |
| 4,517,247 A | 5/1985 | Suzuki et al. |
| 4,525,136 A | 6/1985 | Rowley |
| 4,664,348 A | 5/1987 | Corsaut, III et al. |
| 4,803,033 A | 2/1989 | Rowley |
| 5,302,336 A | 4/1994 | Hartel et al. |
| 5,527,503 A | 6/1996 | Rowley |
| 5,607,190 A | 3/1997 | Exandier |
| 5,713,864 A | 2/1998 | Verkaart |
| 5,916,647 A | 6/1999 | Weinstein |
| 6,082,780 A | 7/2000 | Rowley et al. |

OTHER PUBLICATIONS

Strobel, Mark et al., A Comparsion of Corona-Treated and Flame-Treated Polypropylene Films, Plasmas and Polymers, vol. 8, No. 1, Mar. 2003, pp. 61-95.

*Primary Examiner* — Monica A Huson
(74) *Attorney, Agent, or Firm* — Hahn Loeser & Parks LLP

(57) ABSTRACT

A process is described for injection overmolding a second polymer onto a crosslinked profile of a first polymer comprising the steps of: heating at least a portion of the crosslinked profile (previously crosslinked to at least approximately 65%) to a temperature which raises the temperature of a skin of said portion of the crosslinked profile from a first temperature to a second higher temperature (e.g., 112-269° F.) for a duration sufficient to heat the crosslinked portion to the second temperature, the crosslinked profile having been crosslinked from a method selected from the group consisting of radiation and silane; inserting at least a portion of the heated portion at least partially into a mold which defines an overmolding profile; injection molding the second polymer over at least a portion of the heated portion of the crosslinked profile into the void of the mold; and crosslinking the second polymer. The affixation between the heated portion of the crosslinked profile and the second crosslinked polymer passing a hot burst pressure test applicable to an intended end use for said combination at 180° F. without any visible separation between the first and second profiles after the test.

20 Claims, 4 Drawing Sheets

PROCESS FOR OVER-MOLDING ONTO CROSSLINKED POLYMERS

CROSS REFERENCE TO RELATED APPLICATION

This application is a continuation-in-part of and claims priority from U.S. patent application Ser. No. 10/905,974, filed on Jan. 28, 2005, now abandoned, which is incorporated in its entirety by reference herein.

TECHNICAL FIELD

The invention described herein pertains generally to a process for injection overmolding a second polymer onto a first polymer wherein the second polymer is affixed to the first polymer, which has been crosslinked to at least 65% prior to injection overmolding. In one aspect of this invention, the tube or other profile (including both solid and apertured profiles) is flash heated to a temperature at the upper end of its extrusion processing temperature, followed quickly by injection overmolding, which affixes the overmolded injection onto the tube.

BACKGROUND OF THE INVENTION

The trend, particularly in plumbing today, is to shift from thermoplastic materials to thermoset polymers, e.g., crosslinked polyethylene wherein at least a portion of the polymer is crosslinked, for example approximately 65% thermoset/35% thermoplastic. However, this shift in materials has a significant impact on processing operations impacting these materials and there are several processing changes which must be incorporated in order to fabricate acceptable parts. The Prior Art teaches that thermoplastic material can chemically bond to itself. However, as the percentage of crosslinking increases, there is less thermoplastic remaining to form this chemical bond. In the Prior Art, as illustrated for example by U.S. Pat. Nos. 5,895,695 and 6,287,501, the conventional wisdom was believed to be the recognition of the need to form the overmolded section at the earliest time when the base underlying polymeric profile was the least crosslinked. When crosslinking using radiation, this is before any crosslinking occurs. With silane crosslinking, this is typically after extrusion, but before crosslinking is complete.

However, there are applications where the tube or other profile is more than 65% crosslinked and an injection overmolding operation is desired. To date, there is no teaching in the art as to how this may be accomplished for PEX B or PEX C. By using the technology described in this application, it is now possible to injection overmold onto profiles having a degree of crosslinking of at least 65% or greater using either silane or radiation as the crosslinking methodology, and still result in an affixation of the injection overmolded polymer (which may become crosslinked or more fully crosslinked) onto the crosslinked underlying profile which had been previously crosslinked to 65% or greater.

SUMMARY OF THE INVENTION

In accordance with the present invention, there is provided a method by which an affixation may be achieved by injection overmolding onto polymeric material which is at least 65% crosslinked using either silane or radiation as the crosslinking methodology, prior to the step of injection overmolding. The method involves flash heating of the crosslinked material.

Additionally, in one aspect of the invention, the polymeric base tubular material is electron beamed to a crosslinking percentage of at least 65% or more, followed by flash heat treatment, and ultimately injection overmolding a second polymer, which may be the same or different from that of the polymeric base material, forming an affixation between the overmolded polymer and the base polymer. The overmolded polymer may be non-crosslinked or partially crosslinked using silane as the crosslinking agent. When the polymers are different, there must be at least some chemical compatibility for affixation to occur with the overmolded polymer.

The final crosslinking percentage of the base polymer and the overmolded polymer are often similar, to within a few percent of each other, although this is not a requirement of this invention.

Therefore, it is an object of the invention to describe a process for injection overmolding onto crosslinked profiles which includes the following steps: (a) heating a portion of a profile of a first polymer crosslinked to at least 65% to a temperature which raises at least the temperature of the skin of the profile portion of the first polymer from a first temperature to a second higher temperature for a duration of time to heat that portion of the skin to a temperature below which the polymer begins to degrade; (b) inserting at least a portion of the heated portion of the profile (optionally having a passageway disposed therethrough) while that portion of the profile is still in a heated condition, at least partially into a mold and if the profile contains a passageway, at least partially onto a suitably configured mandrel, the mold containing a void for receiving a second polymer, the void co-acting with the optional mandrel and the profile to define an over-molding shape; (c) injection molding a second polymer over the heated first profile and the optional mandrel in the void of the mold; and (d) optionally crosslinking the second polymer to a final degree of crosslinking.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
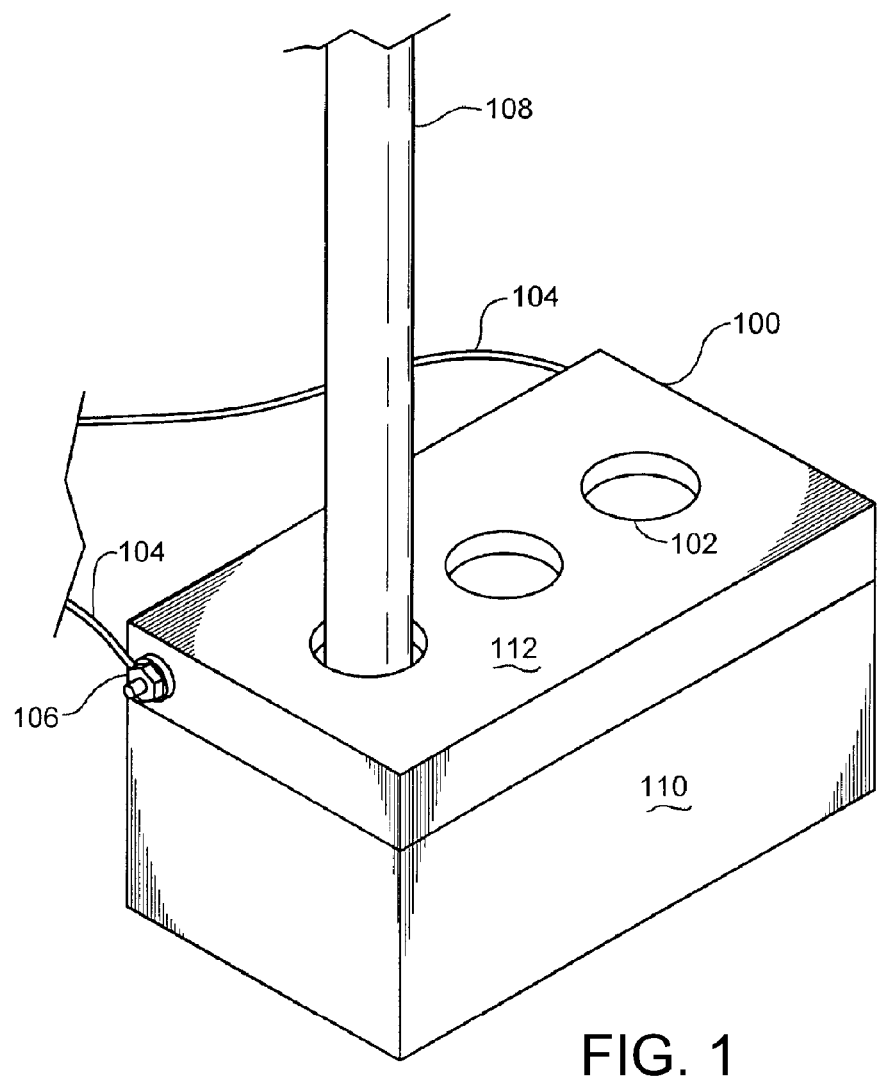
FIG. 1 is a perspective view of an electrical heating apparatus illustrating the flash heating step with a highly crosslinked polymeric tube penetrating into a cavity therein.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims.

Referring now to the drawings wherein the showings are for purposes of illustrating the preferred embodiment of the invention only and not for purposes of limiting the same, the figures show cut lengths of plastic tubing which have overmolded components as well as the process used to achieve such a product. While the figures illustrate tubes, there is no reason to limit the invention to such, the tube merely being illustrative of one profile applicable in the practice of this invention. Similarly, while the figures illustrate either sealing surfaces or overmolded internally-threaded connectors as the overmolded configuration and this also is merely illustrative of one profile applicable in the practice of this invention. More generically, the invention relates to activating the surface of a first profile by "flash" heating or other activating treatment, followed by subsequent injection overmolding of a second profile over at least a portion of the flash-heated segment of the first profile.

As used in this invention, the term "highly crosslinked" means a polymer which has been previously crosslinked to approximately 65% or higher while the term "flash" heating means the application of heat or other form of radiant energy by which at least the surface of the initial profile is raised from an initial temperature to a subsequent higher temperature within a relatively short period of time, typically on the order of a few seconds (e.g., 0.01 to 60 seconds, more preferably 1 to 20 seconds).

As used in this invention, "hot burst test" means a tube with the overmolded detail is connected to a mechanism representative of how the overmolded profile and tube combination would be connected when in actual use. The tube is then inserted into a tank of water which has been heated to approximately 180° F. and allowed to equilibrate at that temperature. A valve is opened and pressure increased until the tube or overmolded connection fails, allowing the pressure to escape.

As used in this invention, "approximately" and other associated degrees of approximation mean the normal precision associated with the applicable measurement as used in the end-user crosslinked polymeric tube plumbing and fittings industry.

Figure 2:
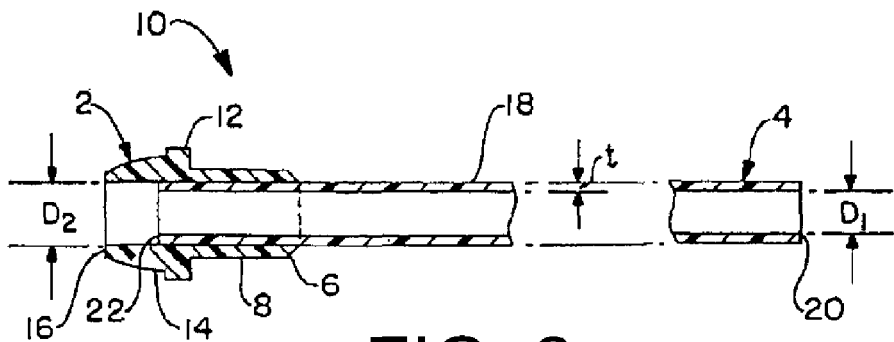
FIG. 2 is a cross-section view of a plastic tube showing one connector overmolded onto a highly crosslinked polymeric tube.

Prior to the step of injection over-molding and illustrated in FIG. 2, connector 10 will have its tubing segment 18 crosslinked to a degree of at least 65% or greater, a percentage which was previously believed to not permit the formation of an affixation to the crosslinked tubing segment by injection overmolding. The leak-proof engagement of nose cone 2 with tube 18 is effected by a employing a flash preheating step about the external periphery of the overmolded section 6 of tube 18. When using silane as the crosslinking agent for polyethylene, this flash preheating step involves heating about the periphery at 550° F. for approximately 10 seconds, although it is recognized that this temperature and duration will vary depending on the amount of crosslinking agent contained in the tube, the composition of the polymer, and thickness of the tube. It is also recognized that there is an inverse relationship to the temperature of the electric resistance heater used and the duration of exposure to that temperature, e.g., when using higher temperatures, shorter durations are employed and vice-versa. As illustrated in FIG. 1, flash preheating may involve insertion of a highly crosslinked tube 108 into an electric resistance heater block 100 having a top 112 and bottom 110 component. Current is transferred to the block via electrical wires 104 with connectors 106. The heating block typically contains at least one, and preferably more than one apertured openings 102

In this manner, it is possible to obtain an affixation, thereby effecting the leak-proof attachment of the nose cone to the tube, even when the portion of the tube to which the injection overmold is applied is crosslinked to at least 65% prior to the step of injection over-molding. The resulting overmolded portion of the connector is subsequently crosslinked by radiation, or allowed to continue to crosslink when using silane crosslinking. Therefore, what has been shown is the ability to form an affixation using base material which is at least crosslinked to 65% before the injection overmolding process, followed by further crosslinking subsequent to the leak-proof attachment. In a preferred embodiment, the injection overmolded material is not crosslinked prior to the step of overmolding.

The overmolded polymer will either be silane PEX ("PEX B") or irradiation PEX ("PEX C"). Silane PEX B materials are often referred to as moisture cure materials because they crosslink when exposed to water. In this method, silane-grafted polyethylene is first combined with the catalyst master batch and injection molded onto the already crosslinked polymeric material. Once the over-molding operation has been completed, crosslinking is accomplished over time, although exposing the product to moisture will accelerate the process. Irradiation PEX C is similar in some aspects to silane PEX in that it must first be injection molded with subsequent crosslinking achieved by bombarding the product with electromagnetic (gamma) or high-energy electron (beta) radiation.

Peroxide PEX (PEX A) derives its name from the class of chemicals used to achieve crosslinking of the polyethylene. Peroxide materials are incorporated into the base polyethylene resin and by heating the polyethylene above the decomposition temperatures of the peroxides, free radicals are produced which initiate the crosslinking process. The Engel method is one subset of this method of crosslinking. In this method, chemical crosslinking occurs during the manufacturing processing when the polyethylene is in its amorphous state (above the crystalline melting point). Crosslinking polyethylene using peroxides (PEX A) requires a temperature which is well over the crystalline melting point of polyethylene, i.e., at least 270° F. Under these conditions, crosslinking occurs when polyethylene is in its amorphous state.

Crosslinking polyethylene using silane (PEX B) takes place at temperatures well below the crystalline melting point. In a typical manufacturing process, crosslinking occurs after the extrusion process by placing the tubing in a hot water bath or steam sauna. Typically, a liquid silane blend is mixed together with polyethylene and a catalyst masterbatch just prior to entering the extruder. Once inside the extruder, the peroxide creates free radicals due to the heat. The free radicals allow the trimethoxysilane to graft onto the backbone of the polyethylene as illustrated below.

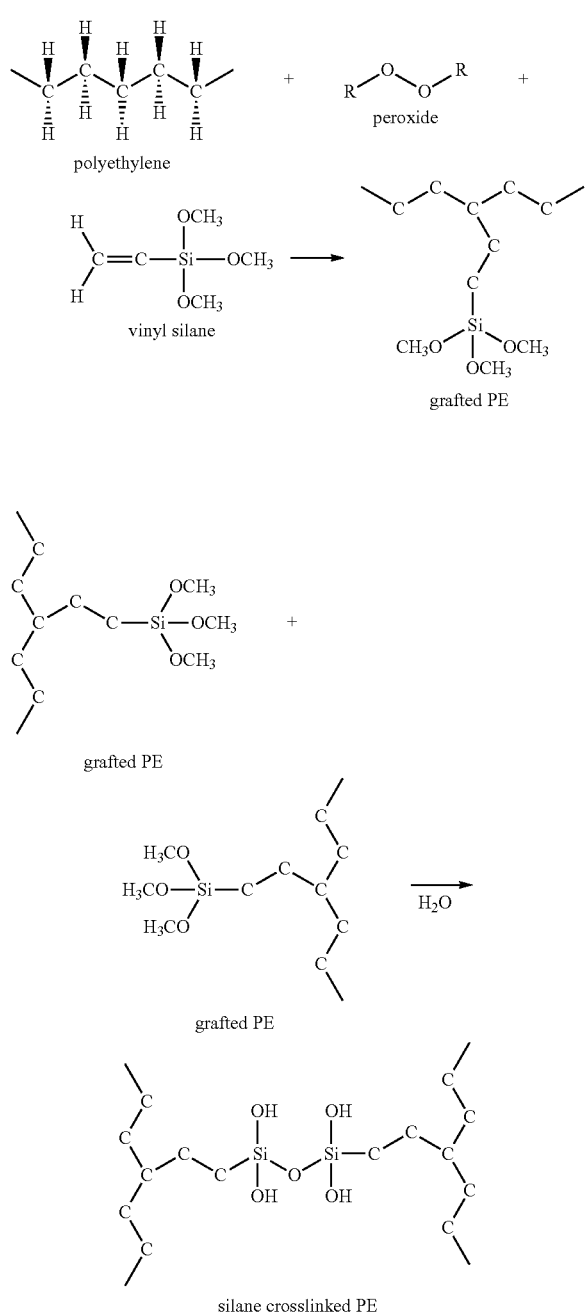

grafted PE silane crosslinked PE

Crosslinking using radiation, similar to crosslinking using silane, occurs at temperatures below the crystalline melting point. Without being held to any one theory of operation, the temperature of crosslinking (whether above or below the crystalline melting point is believed to be at least one factor in whether a successful overmold can be formed using the approach outlined in this invention.

As used in this application, "flash heating" is defined as the time and temperature at which the exterior of the crosslinked tube becomes receptive to the formation of an affixation with the injection overmolded material. The temperature needed to successfully achieve a affixation will depend on the nature and composition of the underlying material as well as that of the injection overmolded material. For example, when the underlying material is polyethylene which has been crosslinked to at least 65%, the temperature of the radiation heating device preferred for the short duration heating is approximately 550° F. It is recognized that the crystalline melting temperature of high density polyethylene is between 266-278° F., and therefore, this heating is approximately double that of the polymer's melting temperature. It is also recognized that the extrusion processing temperature for high density polyethylene ranges between 350-500° F., for injection molding and from 350-525° F., for extrusion processing. Therefore, it is seen that the degree of heating is at the upper end of the processing regime for this particular polymer in its non-crosslinked state. It is appreciated that even higher processing temperatures could be employed, but the duration time exposure would correspondingly need to be decreased, the two parameters being in inverse relationship to each other. The amount of pressure needed to successfully injection overmold will also be dependent upon the degree of crosslinking of the material which is being pushed through the injection molding equipment; with pressure ranging between 100-500 psi depending upon the melt temperature employed which can range from 350-450° F., for silane PEX (PEX B). In one preferred embodiment involving high density polyethylene, "flash heating" temperatures ranged from approximately 350° F. to 550° F.

For polypropylene resins, the melt temperature is approximately 334-340° F. The associated temperatures and pressure described previously for high density polyethylene would have to be appropriately modified higher. Similar considerations apply for other polyolefin resins.

The time between the application of heat and the application of pressure is also important. The external peripheral temperature of the skin of the tube must not drop to such an extent as to render the flash heating step irrelevant, although some degree of heat loss is inevitable between the removal of the tube from a heating environment into the cavity of a mold wherein the injection molding step will be performed. The time between the two operational steps is dependent once again, upon the ability of the polymeric tube to retain heat, which is a function of the thickness of the part which was heated, the temperature of the external environment, the physical proximity of the heating device and the injection molding equipment, etc. In general, this time should be maintained to a minimal amount of time, generally less than one minute.

The temperature of the skin of the flash heated tube increases with the length of flash heating time, as shown in the following table:

| Heating Duration (sec) | Skin Temperature (° F.) |
|---|---|
| 2 | 112 |
| 4 | 156 |
| 6 | 174 |
| 8 | 216 |
| 10 | 238 |
| 12 | 269 |

In a preferred embodiment, the skin temperature after flash heating is at least approximately 112° F. and less than approximately 269° F. In a more preferred embodiment, the skin temperature after flash heating is at least approximately 156° F. and less than approximately 238° F. In a still more preferred embodiment, the skin temperature after flash heating is at least approximately 174° F. and less than approximately 216° F.

The preferred polymer in this invention is polyethylene. The main features which influence the properties of polyethylene are (1) the degree of branching in the polymer; (2) the average molecular weight; and (3) the molecular weight distribution. Polyethylene is partially amorphous and partially crystalline. The percent crystallinity has a marked effect on physical properties. Side chain branching is the key factor controlling the degree of crystallinity. High density polyethylene (HDPE) has fewer side-chain branches than low density polyethylene (LDPE), and therefore, a more tightly packed structure and a higher degree of crystallinity can be obtained. HDPE is characterized as being a highly crystalline material, perhaps as much as 85% while LDPE exhibits crystallinities as low as 50%. The amount of branching is controlled in the LDPE and HDPE processes in order to adjust crystallinity and physical properties.

The density of polyethylene affects many physical properties. In general, increasing density increases stiffness, tensile strength, hardness, heat and chemical resistance, opacity and barrier properties, but reduces impact strength and stress-crack resistance.

As used in this application, low density polyethylene will mean an ethylene polymer which has a specific gravity of about 0.89 to 0.915, a tensile strength of about 1,500 psi; an impact strength over 10 ft-lb/in./notch; a thermal expansion of $17 \times 10^{-5}$ in/in/° C. When discussing high density polyethylene, an ethylene polymer which has a specific gravity of about 0.94 to 0.95, a tensile strength of about 4,000 psi; impact strength of 8 ft-lb/in/notch. It is of course recognized, that it is possible to use materials which are a blend of various polyethylenes or other compatible materials in many different ratios. When discussing crosslinked polyethylene, an ethylene polymer, either low or high density, will be intended wherein the polymer has been either exposed to radiation with electron beam or gamma rays, crosslinking taking place through a primary valence bond, or by chemical crosslinking means, such as by using an organic peroxide, or by using silane. The range of crosslinking for the base tube will be at least 65%, and often higher, e.g., 70-75%. Depending on the degree of pre-treatment prior to flash heating, the crosslinking percentage for the base tube can be as high as 90%. The overmolded material is generally not crosslinked or minimally crosslinked at the point of injection over-molding, although the limitation is generally restricted only by the flowability of the crosslinked polymer in the runners of the injection molding equipment. From a practical standpoint, this means that that the overmolded material will not be crosslinked during the injection overmolding step, although if higher pressures are tolerated by the equipment, it may be possible to injection overmold polymer that has some degree of crosslinking, e.g., 10-20%. Post-injection molding steps generally include further crosslinking of the overmolded polymer, particularly if the polyethylene uses silane as the crosslinking agent or the overmolded polymer is crosslinked by exposure to electron beam radiation. Often, the post-injection molding processing will also increase the percentage of crosslinking in the base polymer. It is recognized however, that the post-injection molding step of further crosslinking is a preferred embodiment, and not necessarily required.

When following the process within the parameters defined above, an affixation between the crosslinked polymer and overmolded polymer is achieved and which further passes the hot burst test involving testing the affixation at pressure above 550 psi at 180° F. followed by visual inspection of the affixation to determine that there was no separation. It is recognized within the industry that the ultimate hot burst pressure is dependent upon tube configuration and tube diameter, e.g., a ¼" tube will have a higher burst value than a ½" tube having the same wall thickness.

As seen in FIG. 2, a plumbing connection 10 is shown having a plastic nose cone 2 at one end which is secured to plastic tube 18 having two opposed ends 20, 22 in a leak-proof manner. Tubing segment 4, the portion of the tube 18 which is not attached to nose cone 2, can be of any desired length and this dimension plays no part in the invention. The nose cone 2 will have a front face 16, and a conical or radiused sealing surface 14 which terminates at shelf 12. The inner surfaces of cylindrical rear surface 8 and radiused surface 6 are used to affix the nose cone in a leak-proof manner to the corresponding section of the outer surface of tubing segment 18. Nose cone 2 has an inner diameter $D_2$ which essentially matches the outer diameter of tube 18. The inner diameter $D_1$ of tube 18 will be smaller than of $D_2$ by a thickness t of the tube.

Figure 3:
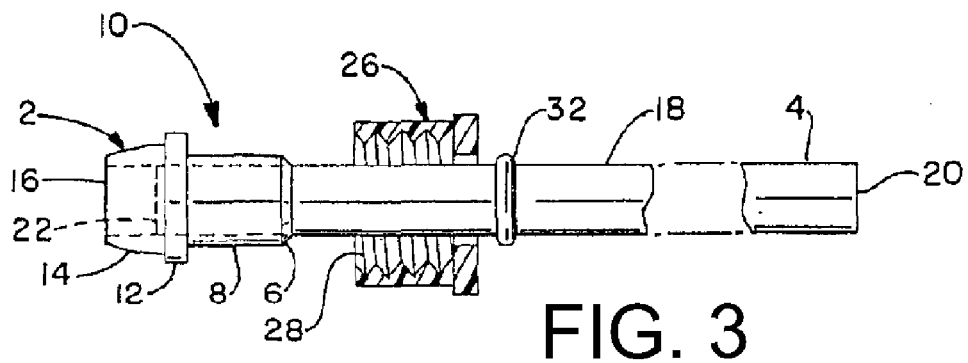
FIG. 3 is a side view of the tube of FIG. 2 including a nut shown in cross-section positioned on the tube and retained in proximity to the sealing surface via protuberances on the connector.

As shown in FIG. 3, nut 26 having a plurality of threads 28 is shown which is used to effect sealing engagement with a mating orifice. In one embodiment of the invention, the connector will optionally have at least one ridge 32 molded into the connector to retain an appropriately sized nut.

Figure 4:
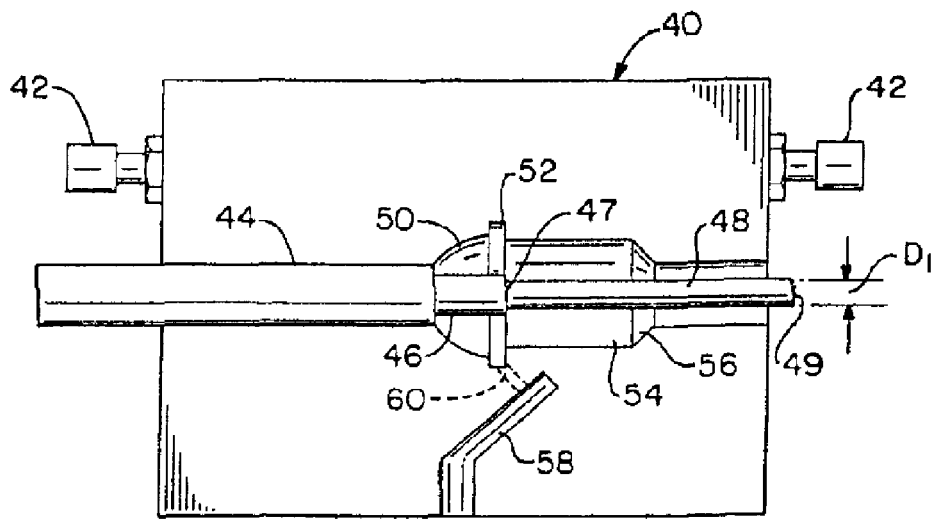
FIG. 4 is a top view of one half of a mold used in the process of over-molding a nose cone onto a highly crosslinked plastic tube.

FIG. 4 shows one preferred embodiment of one-half of a mold 40 which would be effective in the over-molding process. The mold comprises a mandrel 44 having extending portions 46, 48 and terminating at a point outside the mold 40. It is not necessary that the mandrel extending portion have two different diameters as shown in FIG. 4, although this is preferred. At least a portion of the extending mandrel will have an outer diameter which essentially matches the inner diameter of the plastic tube, to permit the insertion of the tube onto the extending portion of the mandrel. The mold will have a radiused or conical base 50 which will form the sealing surface of the nose cone terminating in a mold shelf recess 52. Cylindrical mold portion 54 extends from this shelf recess and terminates in radiused mold portion 56. Over-molding feed conduit 58 is used to transfer flowable polymer from a source (not shown) into mold 40 via transfer conduit 60 shown in the Figure to be at the location of mold shelf recess 52, although there is no reason to limit the location to this point, other entry points being satisfactory depending upon design criterion and location of the parison. Connectors 42 are used for heating and optionally cooling of the mold.

Figure 5:
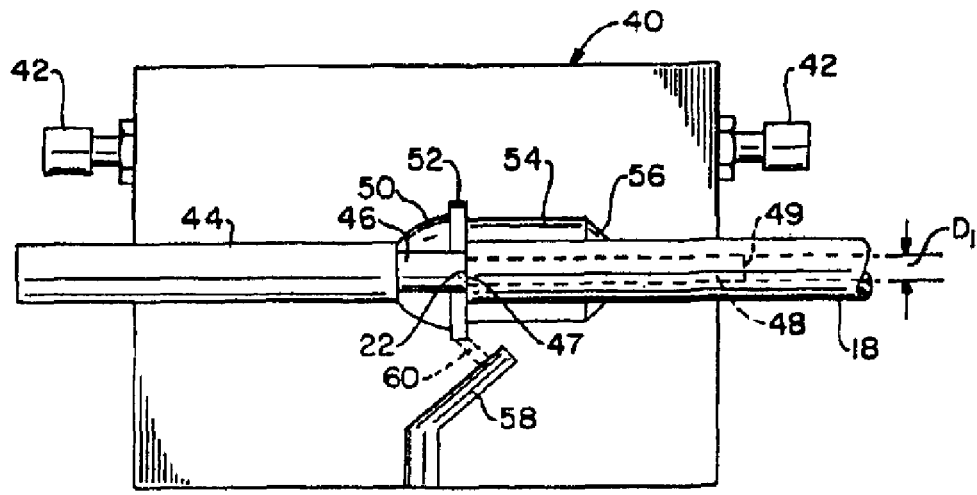
FIG. 5 is a view similar to FIG. 4 showing the highly crosslinked plastic tube inserted over the mandrel in the mold.
Figure 6:
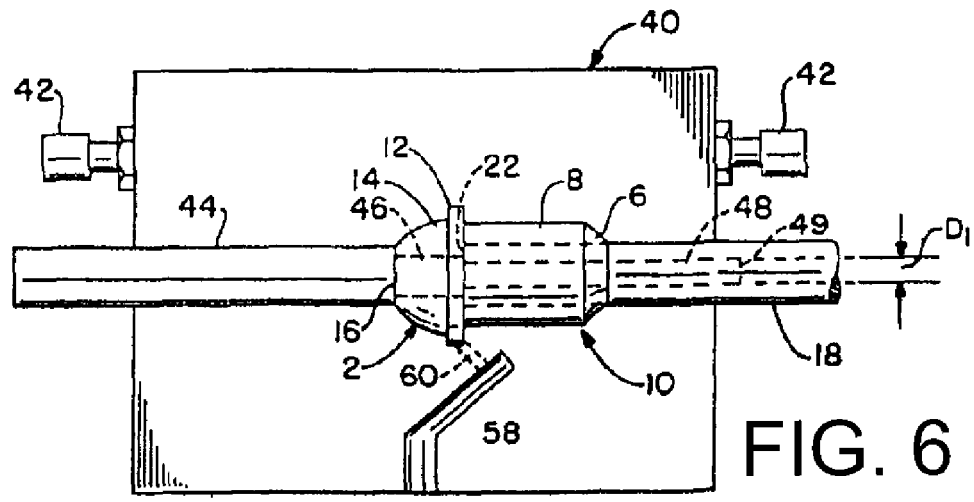
FIG. 6 is a view similar to FIG. 5 with the nose cone shown overmolded onto the highly crosslinked plastic tube.

FIG. 5 shows the positioning of the plastic tube 18 onto the extending portion 48 of the mandrel 44 terminating at the terminal shelf 47 of the first larger extending portion 46 of the mandrel 44 while FIG. 6 shows the product after the overmolding process has been completed. It should be recognized that the precise location of the first terminal shelf 47 of the first extending portion 46 of the mandrel 44 need not coincide with the location of nose cone shelf 12, although it often will be in the vicinity thereof. In some instances, the extending mandrel portion will only be the second smaller diametered section, and the first extending portion will be eliminated completely.

In operation, the mold cycle times and temperatures used will be dependent upon the composition of the materials used and the geometry of the part(s) being molded as well as the degree of dimensional control required for the molded product. It is possible to have a cycle time range from five seconds to several minutes depending on the curing time for the molded material. In general for crosslinked polyethylene tubing, the temperatures used will range from 350° F. up to 540° F. although similar operations variables which were discussed for the mold cycle time are equally applicable here. Molding pressure will also be subject to similar considerations, and for crosslinked polyethylene, can range from 200 psi to 2,000 psi (hydraulic). In general, the colder the melt, the higher the pressure which is required to fill and pack the mold. If the part which is to be molded has a very thick section, then it may be desirable to use a low melt temperature, high melt pressure and as low a cycle time as possible. Given the interactivity between the above variables in an injection molding process, the range of the processing variables is almost limitless within broad guidelines and within the skill of those in the art.

Figure 7:
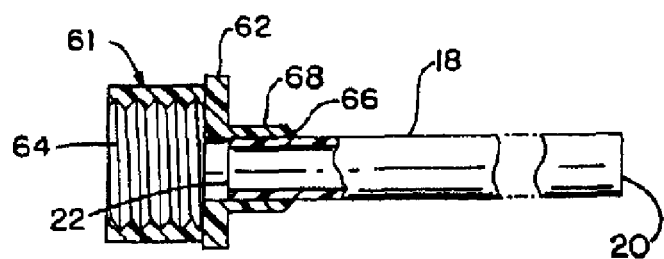
FIG. 7 is a side view shown in partial cross-section of an overmolded nut.

While the above discussion has focused attention on the over-molding of a nose cone, there is no need to limit the invention to such. In fact, as shown in FIG. 7, an overmolded nut is shown, said nut having been formed by analogous processing to that described previously for nose cones. The overmolded nut 61 is shown affixed to tube 18, the nut containing a threaded bore 64 and a shoulder 62. The inner surfaces of the barrel portion 68 and radiused taper 66 are used to affix the nut in a leak-proof manner to the corresponding section of the outer surface of tubing element 18. This nut in a preferred embodiment will be glass-filled polyethylene and will optionally incorporate an "O" ring to seal. In this configuration, it is obviously recognized that the tube would turn while screwing the riser into place.

Figure 9:
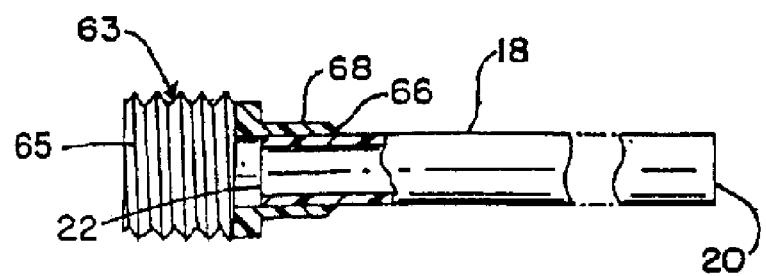
FIG. 9 is a side view shown in partial cross-section of an overmolded threaded connector.

Yet another variation, an overmolded threaded connector, is shown in FIG. 9, which is similar to that shown and described previously with reference to FIG. 7, where an overmolded nut was shown. The threaded connector is formed by analogous processing to that described previously for nose cones, the mold design being different. The overmolded threaded connector 63 is shown affixed to tube 18, the connector being threaded 65 and having a shoulder 62. The inner surfaces of the barrel portion 68 and radiused taper 66 are used to affix the nut in a leak-proof manner to the corresponding section of the outer surface of tubing element 18. This threaded connector in a preferred embodiment will be glass-filled polyethylene.

Figure 8:
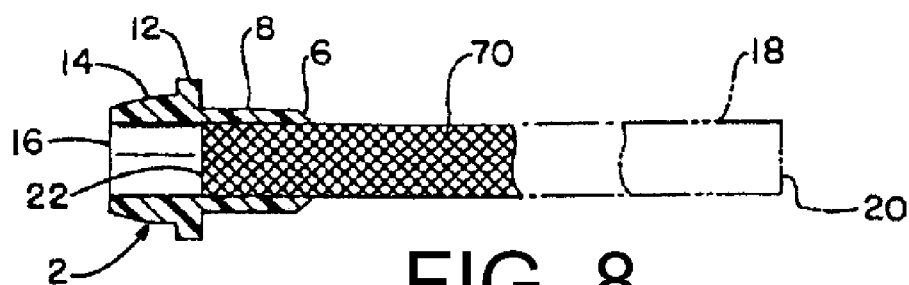
FIG. 8 is a view similar to FIG. 2 showing the nose cone in cross-section and the highly crosslinked tube having an overbraid.

In FIG. 8, yet another embodiment of this invention is shown wherein an overbraid 70 has been applied to the tube prior to the over-molding process. The over braiding could be fiberglass, nylon webbing, stainless steel, etc.

What has been described above, is a process for over-molding profiles (particularly tubes) which comprises the steps of flash heating of at least a portion of a tube of a first polymer profile crosslinked to at least 65%, followed shortly thereafter by inserting the heat-activated profile into a mold for overmolding a subsequent second profile. The mold, which is a split mold, will contain by necessity, a void, the geometry of which defines the overmolded profile. A second polymer is injection molded over at least a portion of the heat-activated first polymeric profile in the void of the mold and the polymers are crosslinked by using any of the crosslinking methodologies well known in the art.

In a preferred embodiment, the first and second polymers are polyethylene and independently crosslinked to an initial degree. For the tube this initial degree will be at least 65%, whereas for the overmolded polymer, this initial degree may be minimal or zero, although it may range to a value less than about 60%. Post injection over-molding, the overmolded polymer is further crosslinked to a higher degree, which may ultimately be approximately the same as the final crosslinking percentage as that of the tube. The density of the polymers will impact the degree of flexibility of the product, and by using the process described; it is possible to tailor the characteristics of the final product.

As seen in the Figures, the sealing surface region is selected from the group consisting of a cup-shaped void and a radiused void and the tube contacting region is an essentially tubular void. In a more preferred embodiment, an annular shelf is interposed between the sealing surface region and the tube contacting region. In one aspect of the invention, the tube polymer will be over braided with a mesh, the mesh being either a woven or open mesh.

At times, it may be desirable to insert a nut onto the first polymer after the step of injection molding. Optionally, it is possible to mold a retaining ring onto the first polymer tube by heating a region posterior of the nut until it becomes soft, and at least one end of the tube is compressed along a longitudinal axis of the tube, such as described in U.S. Pat. No. 4,803,033. As taught in the patent, the tube is preheated at a precise area and gripping dies are used to compress the heated area. Upon compression, the heated area is forced to bulge out and fold to form the flange or bellows. A mandrel is inserted into the tube prior to the compression to insure that the tube bulges outwardly.

In another embodiment of this invention, it is possible to over-mold a nut or a threaded connector over one end of the tube, rather than the sealing surface discussed previously. The process involves the same steps with the essential difference being in the mold design, which would contain a void which comprises an internally threaded engaging surface region at a base of the mandrel. In a preferred embodiment, an n-sided shelf if interposed between the internally threaded engaging surface region and the tube contacting region and n is an integer value greater than or equal to 4.

The best mode for carrying out the invention has been described for the purposes of illustrating the best mode as well as alternative embodiments, known to the applicant at the time of the filing of this patent application. The examples are illustrative only and not meant to limit the invention, as measured by the scope and spirit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A process for injection overmolding a second polymer onto a crosslinked profile of a first polymer comprising the steps of:

heating at least a portion of said crosslinked profile, said first polymer crosslinked to at least 65% to a temperature which raises the temperature of a skin of said portion of said first crosslinked profile from a first temperature to a second higher temperature for a duration sufficient to heat said crosslinked portion to said second temperature, said second temperature being below the temperature at which said first polymer begins to degrade, said crosslinked profile having been crosslinked from a method selected from the group consisting of radiation and silane, said second temperature of said skin of said portion of said crosslinked profile reaching a temperature of at least approximately 112° F. and less than approximately 269° F.;

inserting at least a portion of said heated portion of said crosslinked profile while said heated crosslinked profile portion is still in a heated condition, at least partially into a mold, said mold containing a void for receiving a second polymer, the void co-acting with the crosslinked profile to define an overmolding profile;

injection molding said second polymer over at least a portion of the heated portion of said crosslinked profile into the void of the mold; and crosslinking said second polymer, an affixation between said heated portion of said crosslinked profile and said second crosslinked polymer being able to pass a hot burst pressure test applicable to an intended end use for said combination of said overmolded polymer and crosslinked profile at 180° F. in which increasing test pressure within the first and second profiles causes a burst failure without any visible separation between said first and second profiles after said test.

2. The process of claim 1 which further comprises the step of
crosslinking said second polymer from an initial degree of crosslinking to a final degree of crosslinking, said step of crosslinking said second polymer using a crosslinking methodology selected from the group consisting of radiation and silane.

3. The process of claim 1 wherein the step of inserting further comprises
at least partially positioning said crosslinked profile onto a mandrel.

4. The process of claim 1 wherein
the first and second polymers are polyethylene.

5. The process of claim 4 wherein
a final degree of crosslinking of said second polymer is greater than 65%.

6. The process of claim 5 wherein
a final degree of crosslinking of said second polymer is greater than 70%.

7. The process of claim 1 wherein
said second polymer is at least partially crosslinked before the step of crosslinking.

8. The process of claim 4 wherein
said first and second polymers are crosslinked to approximately the same final degree.

9. A process for injection overmolding crosslinked tubes comprising the steps of:
heating at least a portion of a skin surface of a tube of a first polymer crosslinked to at least 65% with a heating means to at least approximately 112° F. and less than approximately 269° F. so that said skin surface of said portion forms an affixation with an injection overmolded second polymer, said first crosslinked profile having been crosslinked from a method selected from the group consisting of radiation and silane;
inserting at least a portion of said heated portion of said tube having an inner diameter while said heated portion is still in a heated condition, at least partially into a mold and at least partially onto a cylindrical mandrel, the mandrel having a base and a tip, an outer diameter of said mandrel dimensioned so as to allow the inner diameter of the tube to slide thereon, said mold containing a void for receiving a second polymer, the void co-acting with the mandrel and the tube to define an overmolding shape; and
injection molding a second polymer over the tube and the mandrel in the void of the mold forming said affixation with said first polymer, said affixation between said first and second polymers being able to pass a hot burst pressure test applicable to an intended end use for said combination of said overmolded polymer and crosslinked profile at 180° F. in which increasing test pressure within the first and second profiles causes a burst failure without any visible separation between said first and second profiles after said test.

10. The process of claim 9 which further comprises the step of
crosslinking said second polymer from an initial degree of crosslinking to a final degree of crosslinking, said step of crosslinking said second polymer using a crosslinking methodology selected from the group consisting of radiation and silane.

11. The process of claim 9 wherein
the first and second polymers are polyethylene.

12. The process of claim 11 wherein
a final degree of crosslinking of said second polymer is greater than 65%.

13. The process of claim 12 wherein
a final degree of crosslinking of said second polymer is greater than 70%.

14. The process of claim 9 wherein
said second polymer is at least partially crosslinked before the step of crosslinking.

15. The process of claim 11 wherein
said first and second polymers are crosslinked to approximately the same final degree.

16. A process for injection overmolding crosslinked tubes comprising the steps of:
heating at least a portion of a skin surface of a tube of a first polymer radiation crosslinked to at least 65% with a heating means to at least approximately 112° F. and less than approximately 269° F. so that said skin surface of said portion forms an affixation with an injection overmolded second polymer;
inserting at least a portion of said heated portion of said tube having an inner diameter while said heated portion is still in a heated condition, at least partially into a mold and at least partially onto a cylindrical mandrel, the mandrel having a base and a tip, an outer diameter of said mandrel dimensioned so as to allow the inner diameter of the tube to slide thereon, said mold containing a void for receiving a second polymer, the void co-acting with the mandrel and the tube to define an overmolding shape; and
injection molding a second polymer over the tube and the mandrel in the void of the mold forming said affixation with said first polymer, said affixation between said first and second polymers being able to pass a hot burst pressure test applicable to an intended end use for said combination of said overmolded polymer and crosslinked profile at 180° F. in which increasing test pressure within the first and second profiles causes a burst failure without any visible separation between said first and second profiles after said test.

17. The process of claim 16 which further comprises the step of
radiation crosslinking said second polymer from an initial degree of crosslinking to a final degree of crosslinking.

18. The process of claim 17 wherein
the first and second polymers are polyethylene.

19. The process of claim 18 wherein
a final degree of crosslinking of said second polymer is greater than 65%.

20. The process of claim 11 wherein
said first and second polymers are crosslinked to approximately the same final degree.

* * * * *